Aug. 12, 1958 L. G. GILDERSLEEVE 2,847,048
PERFORATED ROTARY GRATER SHELL
Filed Jan. 25, 1955 2 Sheets-Sheet 1
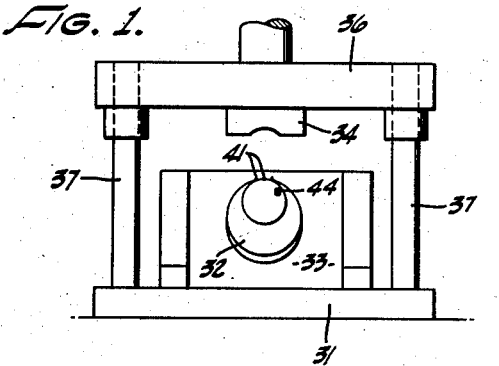
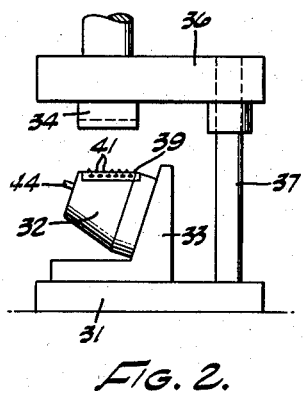
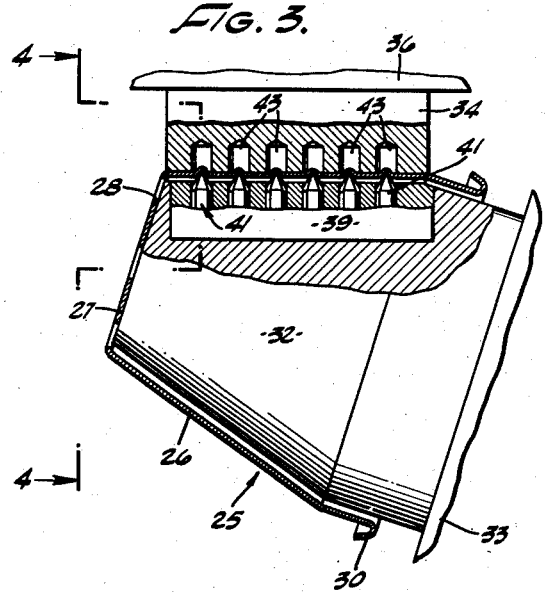
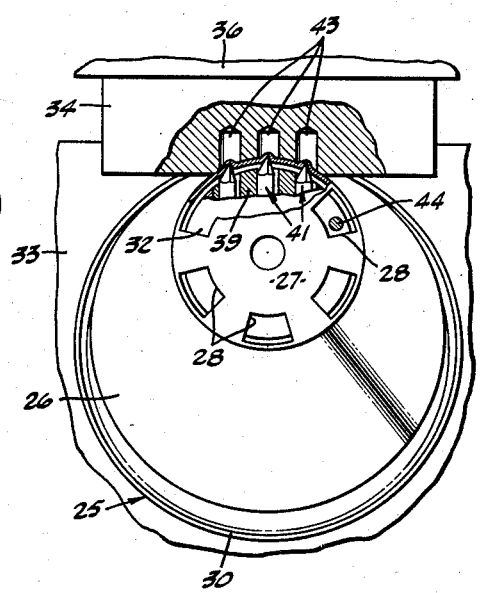
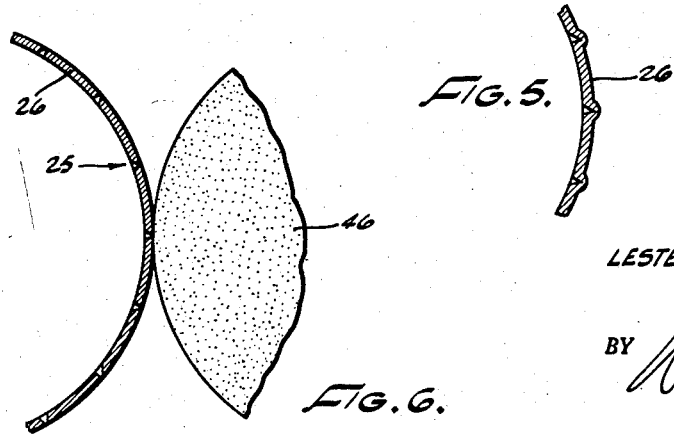
LESTER G. GILDERSLEEVE
INVENTOR.
BY 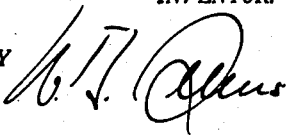
ATTORNEY Aug. 12, 1958　　　L. G. GILDERSLEEVE　　　2,847,048
PERFORATED ROTARY GRATER SHELL
Filed Jan. 25, 1955　　　　　　　　　　2 Sheets-Sheet 2
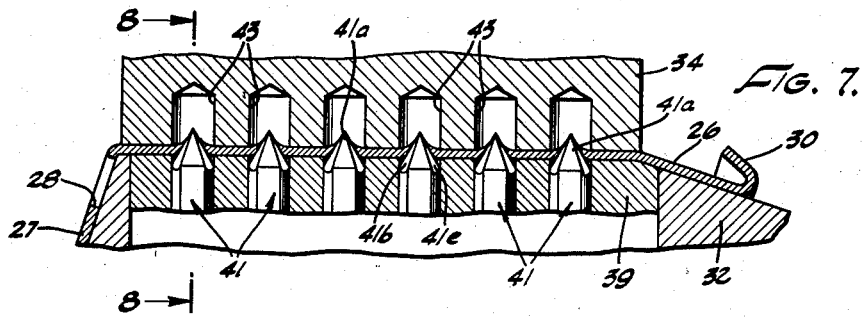
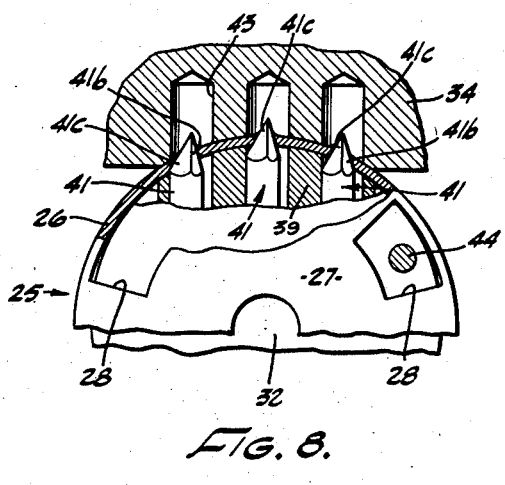
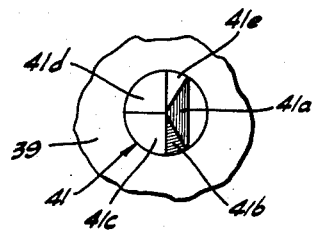
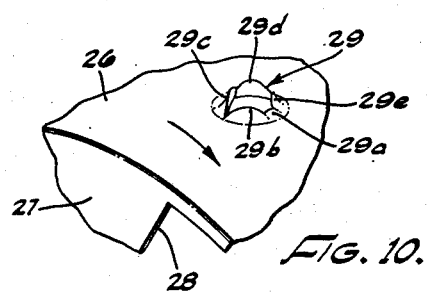
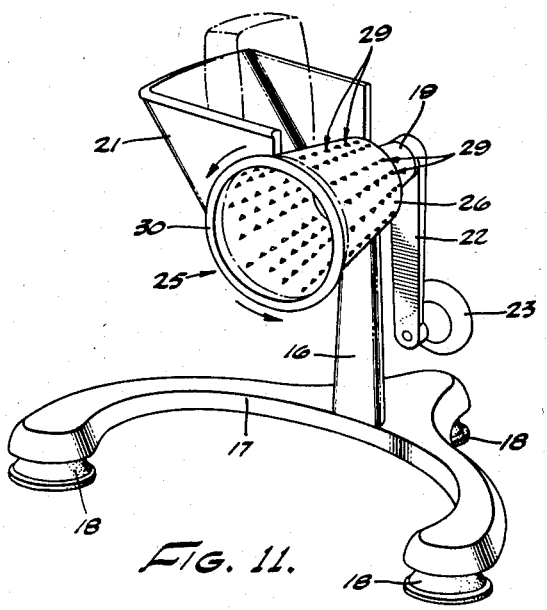
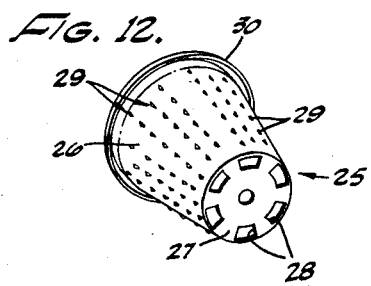
LESTER G. GILDERSLEEVE
INVENTOR.
BY
ATTORNEY United States Patent Office 2,847,048
Patented Aug. 12, 1958

2,847,048

PERFORATED ROTARY GRATER SHELL

Lester G. Gildersleeve, La Crescenta, Calif.

Application January 25, 1955, Serial No. 483,959

4 Claims. (Cl. 146—91)

The present invention relates to a new and improved cutter element for use in manually operated food grinders, and to a method by which it is made. More specifically the invention comprises a rotatable grater for food grinders which comprises a multiplicity of relatively small, sharp cutting edges or knives arranged in spaced groups defining small apertures through which the cuttings pass, and also to the method by which the grater is made.

The manually operable food grinder is used today in grinding, cutting, and shredding different products and substances including food. The unit comprising the present invention is particularly useful in grating of vegetables, fruits, solid soaps, and in fact as a substitute for the well known hand-held grater. The element is adapted to be mounted rotatably in the grinder in a manner such that the material to be grated can be forced against its exterior and the grated particles displaced to its interior and then discharged into a receiving bowl or receptacle.

Heretofore, cutting units incorporated in manually rotatable food grinders have been suitable for shredding, for forming so-called shoe string cuttings, and for slicing. These rotatable units were formed with elongated slots extended generally in the direction of the axis of rotation of the unit and the trailing edges of which were defined by cutting edges, either serrated or straight. In one preferred form adapted to make shoe string cuttings, the unit was formed with slots the rear cutting edges of which were corrugated. In a well known unit suitable for slicing the plane of the slot opening extended substantially radially with respect to the axis of rotation of the unit and the cutting edge was straight. One well known conventional shredder was similar to the unit producing the shoe string cuttings but the slot was wider and the cutting lip corrugated, the corrugations being reduced in size. The present invention comprises a grater in which no elongated axially extending slots are present but instead a multiplicity of perforated cutting points defined by groups of small cutting edges or knives which project above the surface of the rotary body, the knife edges on the trailing side of each opening having a greater radial extent than those on the leading side. These cutting points, and a point is to be understood to include both the opening and the grouped cutting edges by which it is defined, are so staggered upon the body of the unit that upon the rotation of the cutting element the contacted surface of the material acted upon is evenly grated. A very fine cutting is produced, particles much smaller than those produced by the earlier shoe string unit, the shredder, or the slicer. This grater unit is adapted for the use to which the common and well-known hand-held-and-moved grater is adaptable and performs the same function more rapidly and with less effort.

Food grinders are mass produced and it is essential that the rotary cutting units be made in a manner which permits of rapid production at minimum cost. The present invention includes the method by which the grater can be made rapidly, accurately and economically.

With an understanding of the problems which characterize the field of food grinders and of their production, it is an object of the present invention to provide a rotatable grater unit for incorporation into food grinders and also a method for its production which is both rapid and economical.

It is another object of the invention to provide a grater unit for incorporation into a food grinder which is characterized by the presence of a multiplicity of short length cutting blades arranged in spaced groups which define individual apertures through which the cut food or material passes, the groups being arranged in staggered relationship to insure that the surface of the material acted upon is evenly grated.

A further object of the invention is to provide a new and improved grater for incorporation into a food grinder comprising a rotatably frusto-conical body formed with a multiplicity of cutting points each made up of small cutting blades arranged in a group defining an aperture connecting the interior and the exterior of the body and the method by which the grater is made.

These and other more specific objects will appear upon reading the following specification and claims and upon considering in connection therewith the attached drawings to which they relate.

Referring now to the drawings:

Figure 1 is a diagrammatic illustration of the punch press in which the frusto-conical grater body is to be acted upon;

Figure 2 is a side view of the punch press of Figure 1;

Figure 3 is an enlarged section through the die members of the press illustrated in Figures 1 and 2 with the opposing parts of the die brought together in the first step of the method;

Figure 4 is a section upon the broken line 4—4 of Figure 3;

Figure 5 is an enlarged transverse section through the grater body disclosing its condition following the first step illustrated in Figures 3 and 4;

Figure 6 discloses schematically the second step in the process of manufacture in which the exterior protuberances upon the grater body are removed by a grinding wheel;

Figure 7 shows the third step in the process in which the grater body is again subjected to the operation of the press and in which the die members are brought closer together to penetrate completely the body and to form simultaneously three lines of angularly arranged cutting points;

Figure 8 is a section upon the line 8—8 of Figure 7;

Figure 9 is an end view of one of the sharpened pins of the stationary die member showing the angularly related sides which, upon being forced through the grater body, form the cutting points;

Figure 10 is an enlarged showing of a single cutting point and illustrates the five angularly arranged cutting blades which define the point opening;

Figure 11 is a view in perspective of a manually operable food grinder embodying the grater constructed in accordance with the present invention; and Figure 12 is a view in perspective of a grater unit constructed in accordance with the present invention.

Referring again to the drawings, the grater unit which in its structure and its method of formation constitutes the present invention is illustrated by itself in Figure 12 and is shown in Figure 11 incorporated into a conventional grinder. The food grinder general assembly is not a part of the present invention, but in order better to understand the invention reference will be made first to that construction. It is seen that the grinder comprises a vertical standard 16 mounted at its lower end centrally upon a U-shaped base 17 which is itself supported at spaced points by downwardly facing suction cups 18 adapted to seat and seal upon a supporting surface. At its upper end support 16 carries a bearing housing 19 and an integral open topped offset channel or chute 21 the walls of which are so arranged that their projections would extend downwardly and across the front of support 16.

A handle 22 is rotatably supported by the bearing housing 19 and is provided at its outer end with a rotatable grip member 23. An unshown shaft extends from the inner end of handle 22 through housing 19 and supports the cutting unit indicated generally by the reference character 25 and which is removable. Unit 25 constitutes the present invention and is best shown in Figures 11 and 12. It is seen to comprise a frusto-conical body 26 closed at its small end by wall 27, its open larger end being peripherally defined by a rim 30. End wall 27 is formed with a plurality of arcuately arranged cutout sectors 28 by which the unit or element is releasably retained upon the end of the handle shaft in a manner forming no part of the present invention but which is disclosed more fully in applicant's co-pending application, Serial No. 474,866, filed December 13, 1954, and now abandoned. Body 26 is provided with axially extending rows of cutting points 29, each point comprising a plurality of angularly arranged cutting edges or blades defining an opening in the body. The cutting points 29 in the adjacent rows are positioned in echelon to provide an arrangement in which generally parallel helical rows of the cutting points extend from the small diameter end to the large diameter end of the body. It is important to note that each of the cutting points 29 comprises a plurality of angularly arranged outwardly extending sharpened cutting blades which bear the reference characters 29a, 29b, 29c, 29d, and 29e, as is shown most clearly in Figure 10.

Referring now to Figures 1 and 2, a press which can be used in making the cutting element comprising the present invention is illustrated and is seen to comprise a base 31 upon which the fixed die member 32 is mounted by means of fixture 33. A movable die member 34 is carried by the movable head 36 which is slidably mounted for vertical displacement relative to base 31 upon posts 37. As is seen most clearly in Figure 3, fixed die member 32 is shaped exteriorly to conform to the interior of the frusto-conical body 26 of unit 25, and is positioned with its axis so inclined that the line formed by the intersection of a vertical plane through its major axis with its top surface will extend horizontally. In the upper horizontal surface area of die number 32 there is fixedly mounted a pin plate 39 carrying a plurality of vertical pins 41 arranged in axial rows, the pins of each row being offset axially with respect to the pins of each adjacent row so that an echelon arrangement is provided when traveling in a circumferential direction. The pin plate 39 in its external curvature conforms, see Figure 4, to the curvature of fixed die members 32 as do the outer extremities of the vertical pins 41. An indexing pin 44 extends outwardly from the smaller outer end of die member 32 which serves, as will be described, to locate properly the piece being worked upon.

As is shown in Figures 3 and 4, the movable die member 34 is formed with rows of aligned cylindrical recesses 43 so arranged as to be movable toward telescopic relationship with the pins 41 of fixed die 32.

In the first step of the method of forming unit 25 the body 26, which has been shaped into frusto-conical form by any conventional means with a closed end 27 perforated by the sectors 28 and a rim 30 at its open end, is advanced, open end first, onto fixed die member 32. As of this time body 26 is smooth surfaced and its smooth interior rests upon the tops of the upwardly extending pins 41, its end 27 abutting the end of the stationary die 32 and with the pin 44 on the end of die 32 extending through one of the open sectors 28. The positioning is accomplished manually and the operator, after advancing the body 26 onto the die, rotates it in a counterclockwise direction until the right hand end of the sector 28 seats the pin 44 and makes abutting contact therewith. Movable die member 34 is then moved downwardly until contact is made with the surface of the body 26 of member 25 and sufficient pressure is then exerted to force the upwardly extending points of pins 41 into the body wall and the latter into the lower ends of the recesses 43 to make the indentations clearly shown in Figures 3 and 4 but without intentionally penetrating the full thickness of the body wall. The pins raise protuberances in the outer surface of the body 26 as is seen in Figure 5, and the thickness of the metal is partially penetrated by their sharpened ends as is clearly seen in the same figure, the outer extension of the recesses formed extending substantially into the curved plane of the outer surface of the body. Downward movement of the die member 34 is controlled and limited so that the penetration of the pins 41 is only to the extent desired and not farther. As shown in Figure 4, the action described has forced body 26 of the element 25 downwardly so that indexing pin 44 is spaced from the adjacent end of the slot 28 with which it made contact at the time the action began.

The die member 34 is now raised and the unit 25 indexed counterclockwise by rotation to advance indexing pin 44 to the next sector 28 and advancing a new and previously uncontacted area into position to be acted upon by the die members. Cutout sectors 28 in unit end plate 27 are so spaced that with the pin 44 positioned in the next sector 28 and in abutting contact with its trailing side wall, the body 26 will have been advanced sufficiently with respect to the die members that the spacing between adjacent rows of indentations will be substantially equal whether punched simultaneously or not. Stated differently three rows of impressions are made simultaneously and the cutout sectors 28 are so positioned that after the body 26 has been indexed through 360 degrees the individual rows of impressions are equally spaced circumferentially upon its surface.

Following the formation of the indentations and protuberances the exterior surface of the body 26 is subjected to the grinding action of a rotary grinding wheel 46 in the manner indicated in Figure 6. Actually the grinding wheel could be stationary and the unit 25 rotated but the important point is that relative rotation takes place and the raised protuberances on the body surface overlying the indentations made by the pins 41 are ground away by abrasion until the surface is again smooth at which time, as is clearly seen in Figure 6, the outer points of the indentations or recesses almost penetrate the body wall. The grinding action not only produces a smooth outer surface upon the cutting element 25 but additionally recesses provide a knife thin wall surface immediately outside each of the indentations.

Following the grinding operation the cutting unit 25 is returned to stationary die member 32 of the press and subjected to a second and more complete punching operation at the same points of contact. In this step the downward advance of the movable die member 34 is greater and instead of merely forming impressions or indentations in the inner surface of body 26 and protuberances on its outer surface the die member is forced farther downwardly over the pointed ends of the pins 41. This step is illustrated in Figures 7 and 8 and it is there seen that movable die member 34 is advanced relative to the stationary die member to the extent that body 26 of unit is forced downwardly and against the top surface of the pin plate 39 so that the points of the pins 41 have penetrated entirely through the body wall.

Preferably the pointed ends of the pins 41 have a particular shape and configuration in order to impart a particular shape to the sides of the openings formed. The shape of the pin point is shown in Figures 7, 8 and 9 and is seen to comprise converging sloping sides indicated individually by appending of suffixes a, b, c, d, and e to the character 41 indicating the pin. It is to be noted that the slope of side 41a is great and that its included angle at the tip of the pin is more than 90, and approximately 120 degrees. Sides 41c and 41d each have an included angle of about 90 degree arc and slope at a less steep angle than do smaller sides 41d and 41e which have included angles of about 30 degrees. As the advance of each pin is axial and as the faces of the pins have different slopes and widths as stated, they act differently upon the wall material forced outwardly. The result is clearly shown in Figure 10 in which the sides 29a, 29b, 29c, 29d, and 29e comprise, respectively, the faces thrown out by the pin sides 41a, 41b, 41c, 41d, and 41e respectively. Side 41a of the pin having the lesser slope effects a lesser throw-out of the wall than that accomplished by the other sides of the pin. The sides 29c and 29d have the maximum extension and height and were produced by the lesser slope of pin sides 41c and 41d. Each of the sides 29a, 29b, 29c, 29d, and 29e are in effect knife blades for they have been narrowed to their edges by the grinding action of the described steps. It is also important that the pins 41 are all similarly positioned in the pin plate 39; that is, they are all arranged so that the sloping faces 41c and 41d are upon the same side of a central dividing plane extended down each line of pins. In Figure 8, for example, the faces 41c and 41d of each pin in each line is upon the left side of the imaginary dividing plane. As a result of this identical positioning of the pins the cutting edges or blades 29a, 29b, 29c, 29d, and 29e of the points 29 are also identically arranged and the arrangement is such that the high and wide blades 29c and 29d are on the trailing side of each point when the cutting element 25 is rotated in a counterclockwise direction as viewed in Figure 11.

The operation and use of the grater constructed in accordance with the present invention is believed to be clear from the foregoing and from a consideration of the relationship of the unit to the entire grinder as illustrated in Figure 11. With the grater unit 25 in place the rotation of the handle 22 in a counterclockwise direction, as viewed in Figure 11, causes the fruit, vegetable or food stuff to be acted upon by the exterior surface of the body 26 which rotates thereagainst. The material is contacted by the cutting points 29 upon the surface of body 26 as they advance in the direction of travel as indicated in Figures 10 and 11. The lower knives 29a, 29b, and 29e make the first contact for each point while the knives 29c and 29d, which are of greater height and width, trail. The material is literally scraped from the body being acted upon and passes through the point opening and into the interior of unit 25 to slide down its lower inner surface to drop into an awaiting receptacle positioned between the diverging legs of base 17.

The method by which the grater construction in accordance with the present invention is made has been described as a machine but it is to be understood that the entire method can be performed by hand or by any other machine so designed and constructed as to accomplish the steps described. The invention resides in the grater itself, and in the method by which it is formed, not in the machine used to carry out the method.

While the particular apparatus and method herein shown and described in detail are fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A rotary grater shell for use in a food grinder, said grater comprising a cup-shaped sheet metal shell having a bottom merging with a frusto-conical side wall, said side wall having a plurality of generally circular grating openings distributed thereover, said openings each having a plurality of independent sharpened cutting blades distributed about the rim thereof, the blades along the corresponding rim portions of said openings projecting outwardly further from the grater side wall than those on the diametrically opposite sides of said openings.

2. A rotary grater shell for use in a food grinder, said grater comprising a thin-walled cup-shaped metal shell having a bottom and flaring side walls provided with closely spaced generally circular perforations, the rims of said perforations being struck outwardly from axes similarly offset from the center of the perforations, said rim edges on one side projecting to a greater distance than the rim edges there opposite, said further projecting rim edges being sharpened and serrated longitudinally thereof.

3. A rotary grater shell as defined in claim 2 wherein the sharpened cutting blades of individual perforations are generally crescent-shaped circumferentially of said openings, with a pair of said blades being of substantially the same height and merging with one another along the high cutting side of said perforations.

4. A rotary grater shell as defined in claim 3 wherein the bottom of said shell is provided with a ring of arcuate-shaped openings to facilitate the speedy coupling and uncoupling of said grater shell from a food grinder shaft.

References Cited in the file of this patent

UNITED STATES PATENTS

| | | |
|---|---|---|
| 49,836 | Shepardson | Sept. 5, 1865 |
| 861,359 | Dunlap | July 30, 1907 |
| 1,372,239 | Kutter | Mar. 22, 1921 |
| 1,538,609 | Barnett | May 19, 1925 |
| 1,913,357 | Ball | June 13, 1933 |
| 1,979,748 | Kimmel | Nov. 6, 1934 |
| 2,228,025 | Apfelbeck | Jan. 7, 1941 |